Patented Sept. 16, 1930

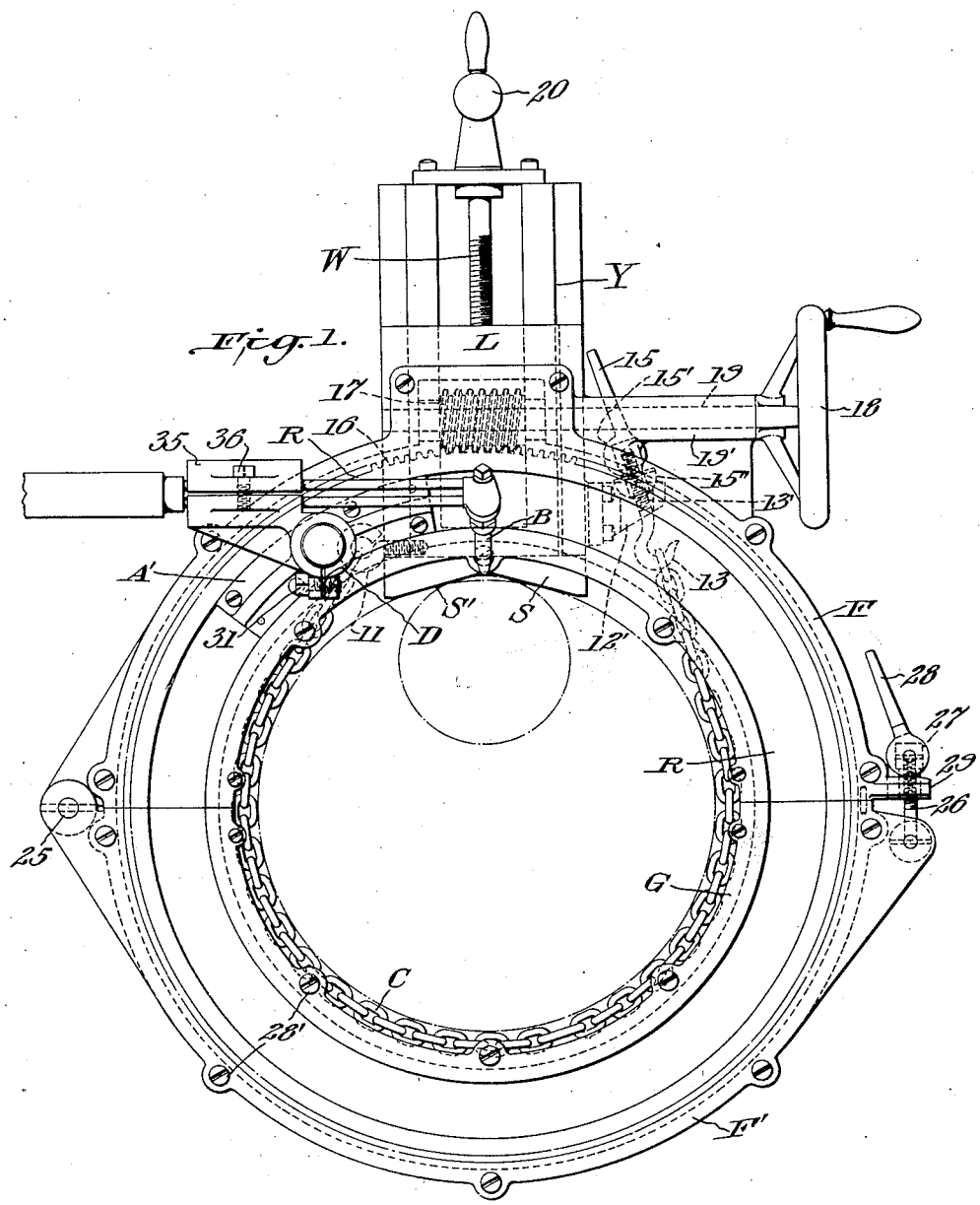

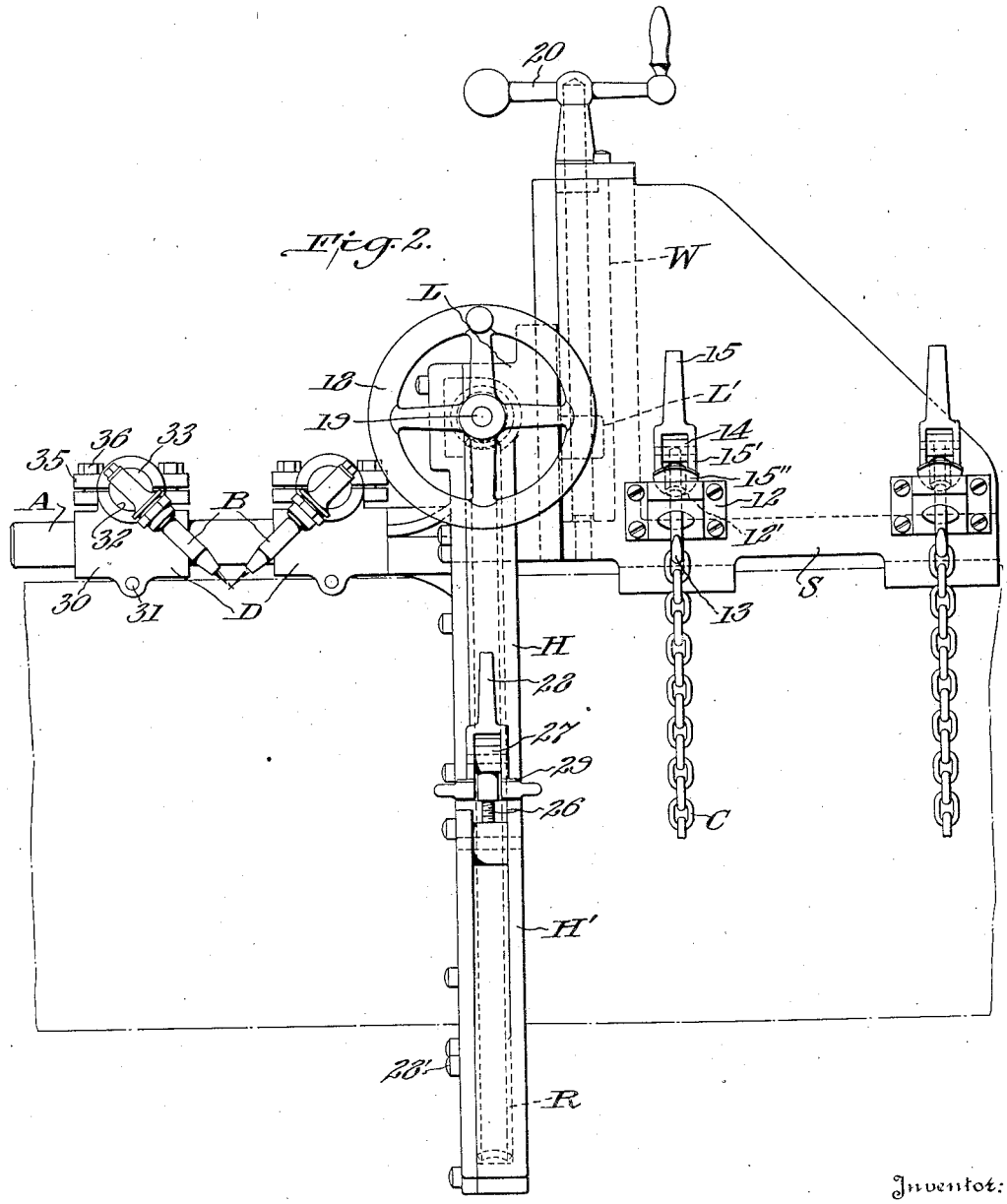

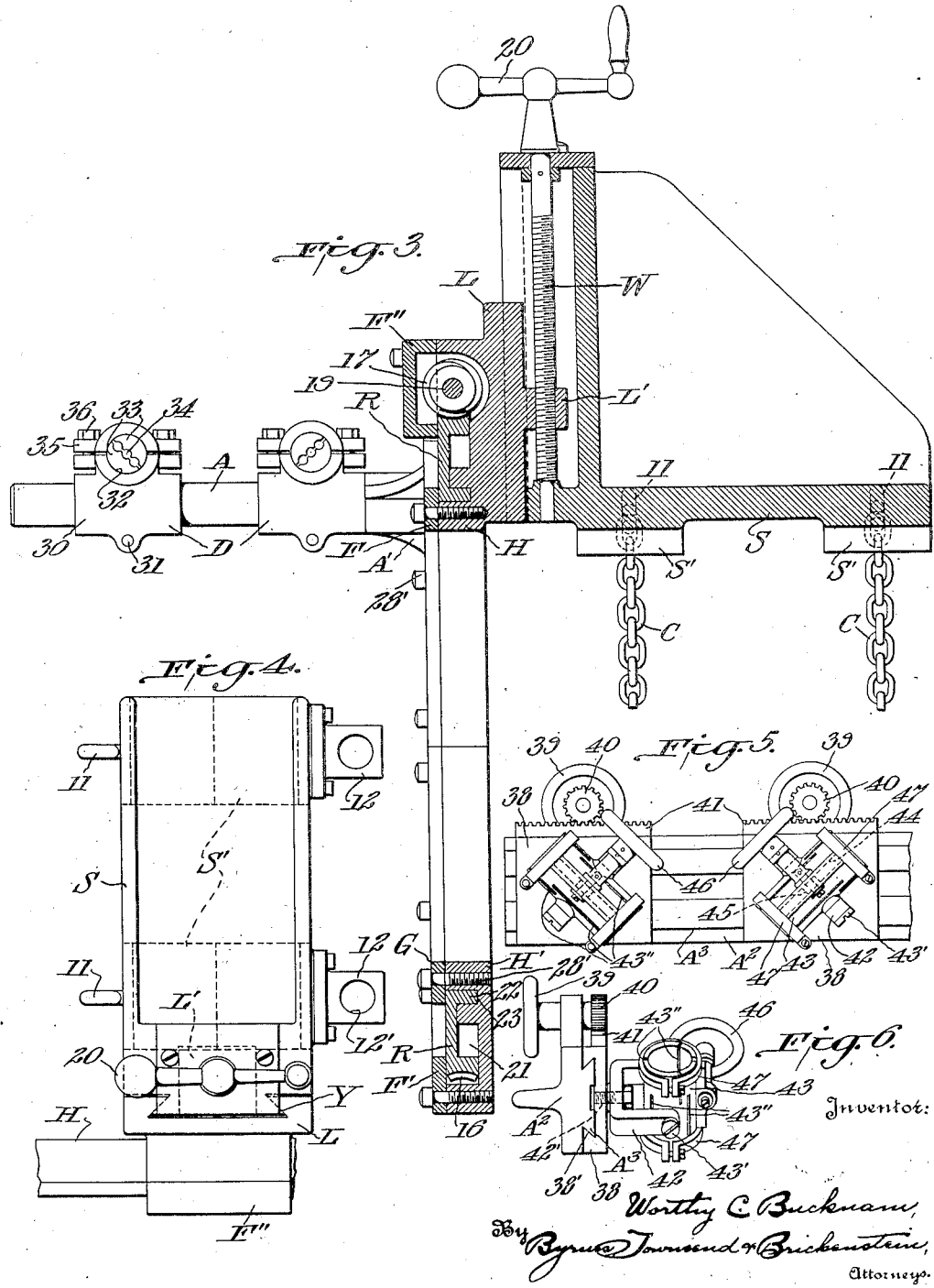

1,775,667

UNITED STATES PATENT OFFICE

WORTHY C. BUCKNAM, OF FREEPORT, NEW YORK, ASSIGNOR, BY MESNE ASSIGNMENTS, TO THE PRAIRIE PIPE LINE COMPANY, OF TULSA, OKLAHOMA, A CORPORATION OF KANSAS

PIPE-CUTTING MACHINE

Application filed December 12, 1923. Serial No. 680,279.

This invention relates to machines for cutting pipes, columns and similar structures by means of suitable jets of gaseous heating and oxidizing agents, but it will be understood that certain features of the invention may be employed in machines for otherwise cutting and welding such articles.

The primary object of the present invention is to provide a machine which shall be capable of cutting or welding various sizes of pipe and the like, and one in which the cutting or welding jet may be directed onto the work at any desired angle, so that in a cutting operation, for example, the severed end of the pipe may be left with a beveled edge for convenience in later welding it to another pipe.

The above and other objects and the novel features of the invention will be apparent from the following description taken with the accompanying drawings, in which Figs. 1 and 2 are, respectively, front and side views of a machine embodying the present invention;

Fig. 3 is a central sectional view of the same, the blowpipe-supporting arm being shown in elevation with the blowpipes removed therefrom;

Fig. 4 is a top plan view of the rear part of the machine; and

Figs. 5 and 6 are, respectively, a side and end view of a modified blowpipe mounting.

Broadly speaking, the present machine comprises a supporting member S adapted to be mounted on and secured to a pipe, shaft, column or other work to be cut or welded, an arm A thereon carrying means for supporting the blowpipe or blowpipes B at the desired angle, mechanism for propelling the arm in a circular path around the pipe or along the work, and means for adjusting the arm and propelling mechanism to accommodate them and the blowpipe to various sizes of pipes or other articles to be operated upon.

The support S of apparatus for cutting pipes and the like is desirably constructed in the form of a saddle having grooved parts S' formed by oppositely inclined surfaces on its lower side to provide a seat adapted to fit pipes of different diameters. The saddle may be securely fastened to the pipe or work by suitable adjustable means. As illustrated, such means may consist of cables or chains C secured at one end to spaced screw eyes 11 on one side of the support S, which chains may be drawn around the outside of the pipe and adjustably secured at their other ends to brackets 12 on the other side of the saddle S, as by hooks 13 which have threaded shanks 13' fitting trunnions 14 pivoted in forked levers 15 having cam faces 15' bearing against the upper faces of semi-spherical washers 15" seated in similar bearing sockets 12' in the brackets 12. The cam levers 15 may be rocked to pull up the slack of the chains or to loosen them, thus providing a simple adjustable means for securely holding the machine on pipes of a wide range of diameters. The flexible devices and the means for securing them to the saddle may be varied as desired.

The blowpipe supporting arm A which may carry one or more blowpipes B is mounted on a bracket A' secured to the outer face of an annular carrier R which, as shown, may consist of a two-part worm gear having teeth 16 on its periphery engageable by a driving worm pinion 17. The pinion 17 may be driven by a motor or manually, as by a hand wheel 18 that is mounted on a shaft 19 carrying the pinion 17.

The annular carrier R is adapted to encircle the pipe or work and is adjustably supported by the saddle S so that it may be readily centered relatively to the pipe on which the saddle is mounted. As shown, the adjustable support for the carrier R comprises a slide L that interfits with and is movable along a vertical dovetail slideway Y on the front end of the saddle S. The slide L is normally stationary during the cutting or welding operation but has a rearwardly extending lug L' having a threaded opening therethrough to receive a feed screw W journalled in the saddle and rotatable by a handle 20 to adjust the slide and carrier in either direction radially of the pipe or work to which the saddle is clamped.

As shown the blowpipe carrier R may be rotatably supported about the work by an annular housing that is suspended from the slide L. For convenience, this housing is desirably made in four sections, the upper rear section H having the slide L and bearing 19' of the shaft 19 formed integral therewith. The upper and lower rear housing sections H, H' have registering channels 21 in their front faces to receive and provide bearing surfaces for the two halves of the worm wheel or carrier R. The registering tongues 22 on the worm wheels have a running fit in registering grooves 23 of the channels 21 to retain and guide the worm wheel in a circular path.

It is generally impractical to place the portable apparatus in position by passing the annular carrier over the end of a pipe and sliding the machine to the cutting or welding point. In order that the machine may be applied directly to the pipe at any desired point, the carrier is made in half sections and the lower housing section is so arranged that it and the carrier section therein may be moved out of registry with their upper half sections to permit the apparatus to receive the pipe or column in the upper half sections, after which the lower sections may be swung back into place. As shown, the lower half of the rear housing is hinged at 25 to the upper rear housing section so that it and the half section of the carrier therein may be swung away from the upper housing section and carrier section sufficiently to admit the pipe or column to be cut. The free end of the lower rear housing section may carry a swingable eye bolt 26 which has its threaded end fitting into a trunnion block 27 pivoted in a cam lever 28 which is adapted to engage against a flange 29 on the upper housing section to hold the lower housing section in place. The front of the housing comprises upper and lower outer sections F, F' and inner sectional retaining ring G. The upper front section F has an extension F'' that provides a cover for the opening in the rear section H containing the pinion 17. The lower front section F' is shaped to correspond to the outline of the lower rear section H'. The sections F, F' project inwardly over the edge of channel 21 and overlap the gear or carrier R therein sufficiently to completely cover the toothed portion thereof. The inner sectional retaining ring G projects outwardly over the channel 21 and holds the inner edge of the sectional gear or carrier in place in the channel 21 and groove 23. Suitable screws 28' secure the front sections and retaining ring G to the rear housing sections H, H'. The edge formed by the sections F, F' is thus spaced from the opposite edge of the retaining ring G to form a guideway for the edges of the base bracket A' which supports the arm A on the carrier R.

The arm A may be provided with any suitable or preferred type of blowpipe clamping means which may be adjustable to set the blowpipe at any place along the arm A and at any angle to the pipe or other work operated upon. The blowpipe holders illustrated in Figs. 1, 2, and 3 are adapted to support hand cutting or welding blowpipes in the desired position relative to the work, but it will be understood that other types of blowpipes and blowpipe holders may be employed. The blowpipe holder D, as illustrated, has a split sleeve 30 adapted to fit and be adjustable along the arm A to which it may be rigidly clamped by a bolt 31. The upper side of the holder has a socket 32 to receive a pair of split bushings 33 which have mating grooves 34 arranged to receive and grip the usual gas carrying pipes between the handle and the head of the hand blowpipe. The split bushings are held in place in the socket 32 by a clamp plate 35 secured to the body of the holder by bolts 36. By loosening the nut 31, the entire holder and the torch thereon may be moved lengthwise or rotated around the axis of the arm A; and by loosening the clamp plate 35, the bushings 33 and the holder gripped thereby may be rotated to any desired position about the longitudinal axis of the blowpipe.

Figs. 5 and 6 illustrate another mounting for the blowpipe means. The arm $A^2$ may be mounted on the rotatable annular carrier R in the same manner as the arm A, whereby such carrier and the blowpipes are movable along the work. i. e., rotatable around the pipe axis. The arm $A^2$ has a longitudinal dovetail guide $A^3$ to fit similarly shaped slots 38' in a pair of blowpipe carriages 38 slidable lengthwise of said arm. Such lengthwise movement may be effected by suitable means, as by handwheels 39 operating pinions 40 which engage racks 41 along the upper edges of the carriages 38. A fork 42 is swivelled at 42' on the front side of each carriage, and between the limbs of each fork a blowpipe clamp 43 is pivoted at 43'. The blowpipes mounted in such clamps may thus be swung into any desired position and secured. The clamp 43 may be grooved lengthwise as at 44 to accommodate a longitudinal rack on the blowpipe (not shown) that is engaged by a pinion 45 rotatable by a handwheel 46 carried by the clamp. The clamp 43 may have longitudinal slots 43'' extending part of its length from opposite ends so that the end portions of the clamp may be slightly contracted by split contracting rings 47 to grip a blowpipe in the clamp.

As illustrated, two cutting blowpipes are mounted on each supporting arm and set so that the cutting or welding jets therefrom will lie in a plane transverse or perpendicular to the direction of their cutting or welding movemeent along the work. The blowpipes may also be set so that the delivered jets intersect at any desired distance below the surface of the work being cut so that suitable beveled edges will be left at the ends of the pipe, shaft or column at the cut to facilitate welding other pieces to such cut ends. This improved method of cutting by means of intersecting jets may also be employed upon other work such as plates, and it will also be understood that the work may be moved while the blowpipes are kept relatively stationary. Various other changes may be made in the details of the apparatus as disclosed without departing from the principles of this invention.

I claim:

1. In blowpipe apparatus for operating upon pipe or the like, the combination of a support, a slide mounted on said support and adjustable radially of said pipe or the like, blowpipe means mounted on said slide and adjustable longitudinally of the axis of said pipe, and means for rotating said blowpipe means and pipe relatively to one another about the pipe axis.

2. In blowpipe apparatus for cutting or welding pipe and the like, the combination of a support, a slide mounted on said support and adjustable radially of said pipe, blowpipe carrying means on said slide comprising an arm extending substantially parallel to the longitudinal axis of said pipe, blowpipe means mounted on said arm and movable lengthwise thereof, means for adjusting said slide radially of said pipe, and means for rotating said blowpipe means and pipe relatively to one another about the pipe axis.

3. In blowpipe apparatus for cutting or welding pipe and the like, the combination of a saddle, means connected thereto for securing the same to different sizes of pipe, a rotatable annular blowpipe carrier adapted to encircle such pipe, an arm mounted thereon and extending parallel to the longitudinal axis of the pipe, blowpipe means mounted on said arm and adjustable lengthwise and transversely thereof, guide means on said support for said carrier, said guide means being adjustable radially of such pipe to position said carrier concentrically to different sizes of pipe, means for adjusting said guide means, and means for effecting relative rotation of said blowpipe carrier and the pipe being cut or welded.

4. In blowpipe apparatus for cutting pipe and the like, the combination of a support adapted to be mounted on a pipe, blowpipe carrying means comprising a rotatable member adjustable transversely of said pipe, an arm thereon extending substantially parallel to the longitudinal axis of the pipe, and relatively adjustable blowpipes mounted on said arm.

5. A machine of the character described for cutting pipe including a support, a rotatable member carried by the support and adapted to surround the pipe, an arm carried by the member and extending parallel with the pipe, and a cutting torch carrier supported by the arm and adjustable thereon transversely of the longitudinal axis of the pipe.

6. A machine of the character described for cutting pipe including a support, a rotatable member carried by the support and adapted to surround the pipe, an arm carried by the member and extending parallel with the pipe, and a cutting torch carrier supported by the arm and adjustable thereon both longitudinally and transversely of the longitudinal axis of the pipe.

7. A machine of the character described for cutting pipe including a support, a rotatable member carried by the support and adapted to surround the pipe, a cutting torch, and means for connecting the torch to the rotatable member, said means permitting adjustment of the torch transversely and longitudinally relative to the longitudinal axis of the pipe and angularly relative to the circumference of the pipe.

8. A machine of the character described for cutting pipe including a support, a rotatable member carried by the support and adapted to surround the pipe, a cutting torch, and means for connecting the torch to the rotatable member, said means permitting adjustment of the torch transversely and longitudinally relative to the longitudinal axis of the pipe and angularly relative to the circumference and longitudinal axis of the pipe.

9. A machine of the character described for cutting pipe including a support, a rotatable member carried by the support and adapted to surround the pipe, an arm carried by the rotatable member and extending parallel with the longitudinal axis of the pipe, a member carried by the arm and longitudinally and rotatably adjustable thereon, and a cutting torch carrier rotatably mounted in the last mentioned member and adjustable transversely of the longitudinal axis of the pipe.

In testimony whereof, I affix my signature.

WORTHY C. BUCKNAM.